E. D. CHAMBERLAIN.
Hand-Stamp.

No. 8,201. Reissued April 23, 1878.

WITNESSES:
C. Clarence Poole
D. P. Cowl

INVENTOR:
Edmund D. Chamberlain
per Atty A. H. Evans & Co

N. PETERS, PHOTO-LITHOGRAPHER, WASHINGTON, D. C.

UNITED STATES PATENT OFFICE.

EDMUND D. CHAMBERLAIN, OF WESTFIELD, NEW JERSEY.

IMPROVEMENT IN HAND-STAMPS.

Specification forming part of Letters Patent No. 163,300, dated May 18, 1875; Reissue No. 8,201, dated April 23, 1878; application filed January 8, 1878.

*To all whom it may concern:*

Be it known that I, EDMUND D. CHAMBERLAIN, of Westfield, Union county, New Jersey, have invented a new and useful Improvement in Hand-Stamps, of which the following is a clear, full, and exact description, reference being had to the accompanying drawings, making a part of this specification, in which—

Figure 1:
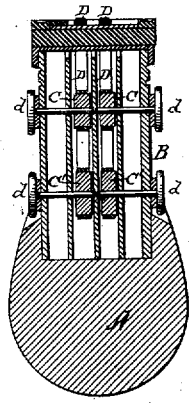
Figure 2:
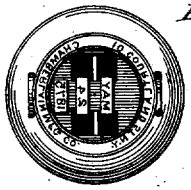
Figure 3:
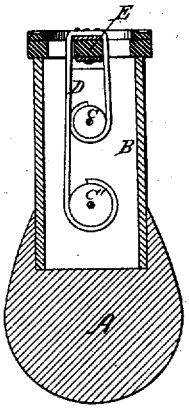

Figure 1 is a longitudinal section, and Fig. 2 is a face view, of a hand-stamp. Fig. 3 is a longitudinal section.

My invention relates to that class of hand-stamps known as "dating or numbering hand-stamps;" and it consists in rubber bands or bands of rubber characters, arranged in such a manner as to be changed from one character to another by means of a spool, and for the purpose of printing.

To enable others skilled in the art to make and use my invention, I will proceed to describe the exact manner in which I have carried it out.

In the drawings, A represents the handle, and B the body, of a hand-stamp. C C′ are drums or spools, having axial bearings in the body B, and located as shown in Fig. 1. On the outer end of each shaft is a thumb-disk, *d*, by means of which the drums or spools are revolved.

D D are bands of rubber characters, with one end attached to the drums C C, and the other end attached to the drums C′ C′, and passing over the cross-bar E on the face-plate of the stamp, where they are brought into position for printing any desired character, as shown in Fig. 2.

By means of the drums, one set unwinding and the other winding up the rubber bands or bands of rubber characters, it is readily understood that any set of characters desired, or any date, may be presented on the face of the stamp ready for printing.

I am aware that endless metal chains, working on sprocket-wheels and carrying type, have been used in stamps of this kind; but these have been found to be costly in construction and easily put out of order.

To overcome these difficulties is the object of my invention.

I do not claim, broadly, the use of letters on rubber, as these are old.

Having thus explained my invention, what I claim as new, and desire to secure by Letters Patent, is—

1. A series of rubber printing-bands, in combination with the cross-bar E, to support the type-bands when being moved and used to print, and the stationary die-plate having the enlarged opening, whereby the characters may be changed without moving the die-plate, all substantially as and for the purpose described.

2. In a hand-stamp, a series of rubber printing-bands, in combination with spools or reels, finger-pieces for moving the same, and a cross-bar, E, to support the type-bands when being moved, substantially as described.

3. In a hand-stamp, strips of rubber characters, in combination with spools or reels arranged to change the printing-characters by winding the strips from one spool to another, as described.

EDMUND D. CHAMBERLAIN.

Witnesses:
WILLIAM C. HALL,
JOHN AMBLER.